Patented July 25, 1933

1,919,675

UNITED STATES PATENT OFFICE

LEO WALLERSTEIN, OF NEW YORK, N. Y., ASSIGNOR TO WALLERSTEIN COMPANY, INC., OF NEW YORK, N. Y., A CORPORATION OF NEW YORK

INVERTASE PREPARATION AND METHOD OF MAKING THE SAME

No Drawing. Application filed August 30, 1929. Serial No. 389,617.

This invention relates to certain improvements in invertase preparations, particularly yeast invertase, and to a method or process for producing such preparations.

Products containing the enzyme invertase are used in certain industries for inverting cane sugar and have gone largely into use in the production of certain confections, as, for instance, the soft or cream centers of which certain kinds of candy are made. The use of yeast, on account of its invertase contents, has been suggested in the Booker United States Patent No. 1,309,979, and a standardized invertase preparation has been suggested in the Paine and Hamilton United States Patent No. 1,437,816. The methods of these patents have, however, certain commercial disadvantages and in a copending application Serial No. 389,616, filed August 30, 1929, I have disclosed an improved invertase product and method of making it, which consists broadly in the treatment of yeast with certain volatile water soluble precipitating agents, the resulting product being separated by pressing, centrifuging or the like, and then dried, this product being substantially odorless, and of high enzyme activity.

It is the especial object of my present invention to provide a modification of the process set forth above in which I so treat autolyzed yeast liquor that I obtain a substantially odorless invertase containing produce of high activity, which can be prepared in either a dry form or a liquid form, and can be readily standardized to the desired standard of enzymatic activity.

A further object of the invention is the production of such product which can be used either in a dry or in a liquid form, and in which certain standardizing agents are employed which enhance the usefulness of the product.

A further object of the invention is to obtain a secondary product or residue after the invertase has been extracted which can be used for food or for pharmaceutical purposes.

With these and other objects not specifically referred to, the invention consists in certain novel processes and methods and certain novel products which will now be described and claimed in the appended claims.

In accordance with the present invention, I first prepare an autolyzed yeast liquor, that is, a liquor produced by permitting the yeast to undergo digestion in the presence of antiseptics, such as toluol, and this liquor so prepared is then preferably filtered.

This autolyzing of the yeast solubilizes the major part of the cell contents including the invertase, which diffuses into the liquor and can be separated from the other cell contents. This liquor is then treated with certain volatile water soluble precipitating agents which act to form a precipitate containing substantially the active invertase, and I have found that the precipitating agents referred to in my copending application are suitable for the treatment of this autolyzed yeast liquor to produce a product which is substantially odorless, stable, and of high enzyme activity. Among such precipitating agents may be named acetone, ethyl carbinol, dimethyl carbinol, trimethyl carbinol and diacetone alcohol. The autolyzed liquor in carrying out the process in the best way known to me is mixing with one of these precipitating agents, or a mixture of them, a proportion found effective in practice being one part of the liquor to about two parts of the precipitating agent by volume. These proportions may be varied, but, of course, sufficient of the reagent will be used to insure a proper separation of the enzyme containing precipitate. The process is carried at room or preferably a lower temperature, say 60° F. for a short time, as, for instance, fifteen to thirty minutes. The enzyme containing precipitate is then separated or recovered from the liquor, either by filtering, centrifuging or other desired method, and carefully dried at a low temperature, preferably not exceeding 100° F. The resulting product is then standardized by mixing with substances which will not interfere with its further use and which in some respects improve the product, as, for instance, starch, dextrose, saccharose, etc., and brought thereby to the desired standard of invertase activity.

If desired, the invertase containing precipitate may be mixed with these standardizing substances before drying, the mixture being then dried jointly, a step which I have found facilitates the drying of the product.

The products finished in either way are very stable if kept dry and not exposed to excessive humidity, and are practically odorless, and can be very conveniently used by the consumer, being particularly adapted for use in making certain confections, as the soft or cream centers used in candy making.

The product just described is in dry form. Under some circumstances, it may be desirable to produce a standardized liquid product. This may be conveniently effected by disolving the active principle from the enzyme containing precipitate produced by the above described process in water, or preferably in glycerine solution of the required concentration. In practice, I have found satisfactory results with a 40% to 60% glycerine solution, and instead of the glycerine a sugar syrup solution can be used, the dissolved product can then be standardized by further diluting with glycerine or with sugar syrups or corn syrup. The resulting product is odorless, of great stability and of desired standardized activity, and can be used for the same purposes as the dry product produced by the process above referred to.

After the enzyme containing precipitate has been removed, the volatile constituents are regained from the remaining liquor, either by steam distillation or in vacuum. Under proper installation, a very large part of these can be removed to be used again. The remaining liquid is then evaporated either to a liquid or pasty condition and represents a valuable food material, rich in protein materials, vitamin B and the mineral constituents originally present in the yeast cell, and can be used as a base for food and pharmaceutical purposes.

What is claimed is:

1. The process of preparing an invertase preparation from yeast, which consists in preparing an autolyzed yeast liquor, filtering this liquor, precipitating an enzymatic containing substance from this liquor by the addition thereto of dimethyl carbinol, recovering the precipitated invertase containing product, and standardizing this product to a desired standard of invertase activity.

2. The process of preparing an invertase preparation from yeast, which consists in preparing an autolyzed yeast liquor, filtering this liquor, precipitating an enzymatic containing substance from this liquor by the addition thereto of dimethyl carbinol, recovering the resulting precipitated product, dissolving this product, and standardizing the resulting solution to a desired standard of invertase activity.

3. The process of preparing an invertase preparation from yeast, which consists in preparing an autolyzed yeast liquor, filtering this liquor, precipitating an enzymatic containing substance from this liquor by the addition thereto of dimethyl carbinol, recovering the resulting precipitated enzymatic product, adding a standardizing material to the product, and drying the product and added material together.

4. The process of preparing an invertase preparation from yeast, which consists in preparing an autolyzed yeast liquor, filtering this liquor, precipitating an enzymatic containing substance from this liquor by the addition thereto of a volatile water soluble precipitating agent, recovering the resulting precipitated product, dissolving this product in a syrupy material, and standardizing the dissolved product and added material to a desired standard of invertase activity.

5. A yeast product containing invertase and a polyhydric alcohol, standardized as to its active invertase principle.

6. The process of preparing an invertase preparation from yeast, which consists in preparing an autolyzed yeast liquor, filtering this liquor, precipitating an enzymatic containing substance from this liquor by the addition thereto of a mixture of dimethyl carbinol and acetone, recovering the precipitated invertase containing product and standardizing this product to a desired standard of invertase activity.

7. A yeast product containing invertase and glycerine and standardized as to its active invertase principle.

8. The process of preparing an invertase preparation from yeast, which consists in preparing an autolyzed yeast liquor, filtering this liquor, precipitating an enzymatic containing substance from this liquor by the addition thereto of dimethyl carbinol, recovering the precipitated invertase containing substance and adding thereto glycerine in suitable proportions to produce a desired standard of invertase activity.

9. The process of preparing an invertase preparation from yeast, which consists in preparing a liquor containing the enzyme invertase, and adding approximately 60% of glycerine thereto to produce a product having a desired standard of invertase activity.

10. The process of preparing an invertase preparation from yeast, which comprises preparing a liquor containing the enzyme invertase, precipitating the enzyme from this liquor, by the addition thereto of a precipitating agent selected from the group of organic solvents consisting of acetone, ethyl carbinol, dimethyl carbinol, trimethyl carbinol and diacetone alcohol separating and dissolving the precipitate to obtain a preparation of the desired standard of invertase activity.

11. The process of preparing an invertase preparation from yeast, which comprises preparing a liquor containing the enzyme invertase, precipitating the enzyme from this liquor by the addition thereto of a precipitating agent selected from the group of organic solvents consisting of carbon, hydrogen and oxygen compounds substantially soluble in water containing at least three carbon atoms separating and dissolving the precipitate to obtain a preparation of the desired standard of invertase activity.

LEO WALLERSTEIN.